United States Patent Office 3,294,370
Patented Dec. 27, 1966

3,294,370
VIBRATORS
Sven Hedelin, Granitvagen 18c, Uppsala, Sweden
Filed July 31, 1964, Ser. No. 387,271
3 Claims. (Cl. 259—1)

This invention relates to a type of vibrators comprising an exterior part, the housing and an inner part, the rotor. One free end of said rotor is arranged to undertake a planetary movement of rolling in contact with a surface of revolution, that limits the pendulum swing. In this way rotations or vibrations are transmitted to a material, that can be solid or in more or less liquid or plastic state, for example concrete, in order to make this material more fluent. It is customary, to have one end of the rotor supported in the housing, that surrounds the rotor, while the free end of the rotor is formed as a weight (rotor body) which is arranged to roll upon a surface which communicates with the housing, and thus the rotor or the rotor body carry out said planetary movement.

By this planetary movement a substantial increase of the frequency is obtained in; that the pendulum movement of the rotor around the shaft of the housing is faster than the rotary motion around its own shaft. The part of the rotor, situated between the rotor body and the bearing, the rotor shaft, may be either rigid or flexible. In the first case, (a rigid shaft) the swinging motion of the rotor or the conical pendulum is effected in known constructions by making the bearing extend through a spherical ball bearing. In the latter case the swinging motion is carried out in that the rotor is flexible.

The vibrator of some prior art constructions is provided with a guiding bearing, for example a spherical ball bearing. Such a bearing must at the same time effect two kinds of movements, namely, a rotary movement and a tilting-movement. In addition, said bearing must absorb radial as well as substantial axial forces. It is unfavourable to load a bearing with so many functionings, and that has been also demonstrated in the practice. The risk of stoppage due to breakdown and increased wear is created. A further disadvantage with guiding bearing is, that it is difficult to provide a satisfactory sealing against the lubricant of the bearing, so that said lubricant can not flow down on the roller guide with connecting sliding.

According to the present invention, the vibrator is characterized in that the entire rotor is formed as a rigid, non resilient body and that the rotor with one end that is connected to the housing, is attached to one or more resilient means, said means being arranged on the drive shaft carried in the housing, in such a way, that the pendulum movement of the rotor is made possible and that said rotor at said free end is provided with one or more sections (counterweights), said sections extending outside the roller guide of the rotor in a direction away from the coupling in order to obtain a correct geometrical motion and in that the center of the resilient means is not dislocated. Due to this arrangement, the double movement of the bearing or bearings is eliminated, so that said bearings are less strained. Further, a shaft rotating in said bearing (when no pendulum movements takes place) can be provided with an effective and inexpensive, already known lubricant sealing. By balancing the rotor through one or more sections extending outside of the roller path of the rotor in direction away from the coupling, the radial forces actuating on both bearing and coupling are reduced. This section (or sections) causes centrifugal forces and thereby a moment on the rotor that entirely or partially counterbalances the moment of other centrifugal forces acting on the rotor, whereby the radial thrust (radial force) is reduced or almost disappears. However, occasional blows of the vibrator against reinforcement bars or the like might cause a certain radial force. Such a force has however no effect in principle on the advantages resulting from this invention.

The invention will be described in connection with the enclosed drawing, describing two examples of a vibrator according to the invention.

Figure 1:
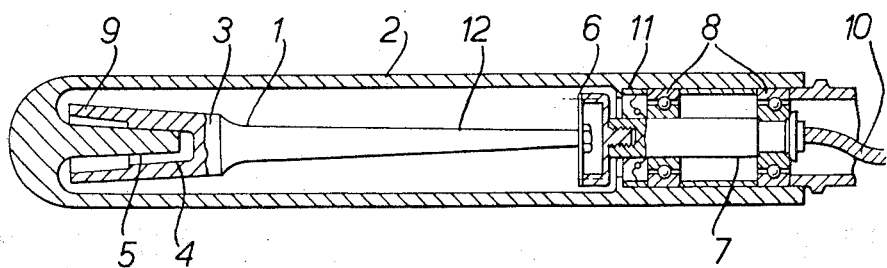
FIG. 1 is a vibrator (partly in section) with the roller guide of the rotor surrounding the roller guide of the housing and with a counterweight.

In the drawing a rotor is indicated with 1 and 2 is an exterior housing. When the rotor rotates it will be thrown out by the centrifugal force and a rotor body 3 with its own roller guiding surface 4 comes in contact with the roller guiding surface 5 of the housing, on which the rotor will rotate. The rotor will on one hand rotate around its own shaft and on the other pendulate around the center line of the housing and performs a so called planetary movement. The rotor is hinged around a resilient means 6, attached to one end of the rotor 1 and also to an axle shaft 7, carried in the housing. Said shaft 7 rotates in two bearings 8 (one or more bearings can be used), through which said shaft is connected with the housing.

During the rotation centrifugal forces arise in the rotor, and mainly perpendicular to the same (against the longitudinal direction of the vibrator). Said centrifugal forces cause radial forces on bearing and coupling, unless the rotor is counterbalanced through one or more sections in form of a counterweight 9. Said counterweight causes a moment on the rotor because of the centrifugal forces, so that the radial thrusts on bearing and coupling are reduced or nearly nullified. A correct geometrical action is hereby obtained and the centers of the membranes 6 are not displaced.

The rotor is driven by a motor (not shown) from which the movement in a known manner is transmitted by means of a flexible shaft. The movement can naturally also be directly transmitted or transmitted in some other manner. Outside the bearings, in the direction towards the rotor, a conventional shaft packing 11 is arranged for lubrication.

The rotor might have a variable section. So for instance the rotor shaft 12 can be tapering towards the coupling. It might consist of several different parts and of different materials. The roller guide on the rotor respectively on the housing can be interchangeable.

Heat can be easily removed from roller guides, couplings etc. through the housing to the surrounding area. If the pendulum movement of the rotor is made possible through being made a part of the rotor, with a flexible rotor shaft, the inclination of the roller guide is preferably such, that the bending of the rotor shaft and consequently the strain, are as small as possible.

The bending of the roller guide can however change because of different wear or incorrect manufacturing, through which the strains on the flexible rotorshaft can be considerably increased.

According to the present invention, the entire rotor including the rotorshaft consists of a rigid, not resilient body, so that the angular displacement of the rotor depends only on the play between the roller guide of the housing and the corresponding part on the rotor shaft, whereby the rotor shaft need not to be made particularly weak with regard to the bending out, the disadvantages of known flexible rotor shafts being eliminated.

Since the rotor or the rotor body of the kind of vibrators in question forms a so called conical pendulum it follows that the roller guide of the housing as well as of the rotor must be conical. Both roller ways are arranged on two cones, normally with a common point, situated in the center of the tilting movement, in this case the coupling. Consequently, the force effecting the rotor from the roller guide of the housing, has an inclined direction and causes hereby an axial force, that must be taken up by the bearings.

Figure 2:
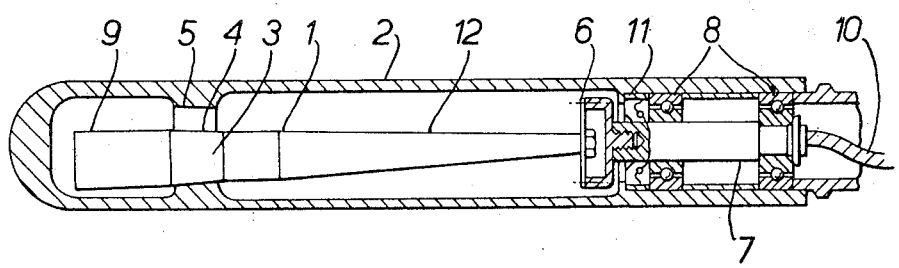
FIG. 2 is a vibrator with the roller guide of the housing surrounding the roller guide of the rotor and provided with counterweight at the end of the rotor.

The rotor body can roll either outside the roller guide of the housing (FIG. 1) or within the same (FIG. 2).

The shaping of the details shown in the drawing and given in the specification can naturally be varied, as well as the details can be combined with each other in different ways within the scope of the present invention, which is not limited to this construction.

I claim:

1. A vibrator, comprising an elongated rigid rotor, having a rotor body at one end thereof, said rotor body having a conical guiding surface, a housing enclosing said rotor and having a conical guiding surface for engaging the guiding surface of said rotor body, a counterweight carried by said rotor body, an axle shaft, hinging means comprising an open box centrally connected with said axle shaft, and a resilient cover carried by and closing said box and centrally connected with the other end of said rotor, bearings supporting said axle shaft and located within said housing and means driving said axle shaft, the guiding surface of said housing being spaced from the guiding surface of said rotor body, whereby said rotor body can carry out a planetary rolling movement relatively to said housing.

2. A vibrator in accordance with claim 1, wherein the guiding surface of said rotor body encloses the guiding surface of said housing.

3. A vibrator in accordance with claim 1, wherein the guiding surface of said rotor body is enclosed by the guiding surface of said housing.

References Cited by the Examiner

UNITED STATES PATENTS 1,549,555 8/1925 Jorgensen.
2,546,806 3/1951 Wenander.

FOREIGN PATENTS 1,312,741 11/1962 France.
142,176 3/1961 Russia.

WALTER A. SCHEEL, *Primary Examiner.*

WILLIAM PRICE, *Examiner.*

R. W. JENKINS, *Assistant Examiner.*